United States Patent
McCarley et al.

(10) Patent No.: US 8,554,558 B2
(45) Date of Patent: Oct. 8, 2013

(54) VISUALIZING AUTOMATIC SPEECH RECOGNITION AND MACHINE TRANSLATION OUTPUT

(75) Inventors: Jeffrey S. McCarley, Bedford Hills, NY (US); Leiming R. Qian, Briarcliff Manor, NY (US)

(73) Assignee: Nuance Communications, Inc., Burlington, MA (US)

( * ) Notice: Subject to any disclaimer, the term of this patent is extended or adjusted under 35 U.S.C. 154(b) by 495 days.

(21) Appl. No.: 12/834,298

(22) Filed: Jul. 12, 2010

(65) Prior Publication Data

US 2012/0010869 A1    Jan. 12, 2012

(51) Int. Cl.

| | |
|---|---|
| G06F 17/28 | (2006.01) |
| G06F 17/00 | (2006.01) |
| G10L 15/00 | (2013.01) |
| G10L 15/26 | (2006.01) |
| G10L 21/00 | (2013.01) |
| G10L 15/04 | (2013.01) |
| H04N 11/00 | (2006.01) |

(52) U.S. Cl.
USPC ............ 704/235; 704/2; 704/3; 704/4; 704/5; 704/6; 704/7; 704/8; 704/9; 704/231; 704/251; 704/277; 348/468; 715/256; 715/263; 715/264

(58) Field of Classification Search
USPC .......... 704/2–9, 231, 235, 251, 277; 348/468; 715/256, 263, 264
See application file for complete search history.

(56) References Cited

U.S. PATENT DOCUMENTS

| | | | |
|---|---|---|---|
| 5,816,196 A | * | 10/1998 | Webster et al. ............... 119/228 |
| 6,175,820 B1 | * | 1/2001 | Dietz ............................ 704/235 |
| 6,393,389 B1 | | 5/2002 | Chanod et al. |
| 7,117,231 B2 | | 10/2006 | Fischer et al. |
| 7,130,790 B1 | | 10/2006 | Flanagan et al. |
| 7,353,165 B2 | * | 4/2008 | Zhou et al. ........................ 704/5 |
| 7,529,656 B2 | | 5/2009 | Miyahira et al. |
| 7,747,434 B2 | * | 6/2010 | Flanagan et al. .............. 704/235 |
| 7,809,549 B1 | * | 10/2010 | Bangalore et al. ................ 704/2 |
| 2003/0061022 A1 | * | 3/2003 | Reinders .......................... 704/2 |
| 2005/0226398 A1 | * | 10/2005 | Bojeun ...................... 379/93.15 |

(Continued)

OTHER PUBLICATIONS

Bandara et al., "Computer-Aided Dialog Synchronization and Subtitle Generation for Video Systems", IBM Technical Disclosure Bulletin, vol. 36, No. 08, Aug. 1993, pp. 119-120.

(Continued)

*Primary Examiner* — Paras D Shah
(74) *Attorney, Agent, or Firm* — Sunstein Kann Murphy & Timbers LLP (57) ABSTRACT

An automated speech processing method, system and computer program product are disclosed. In one embodiment, a speech-to-text (STT) engine is used for converting an audio input to text data in a source language, and a machine translation (MT) engine is used for translating this text data to text data in a target language. In this embodiment, the text data in the target language is rendered on a display device, and different visualization schemes are applied to different parts of the rendered text data based on defined characteristics of the STT engine and the MT engine. In one embodiment, the defined characteristics include a defined confidence value representing the accuracy of the rendered text. For example, this confidence value may be based on both the accuracy of the conversion of the audio input and the accuracy of the translation of the text data to the target language.

8 Claims, 4 Drawing Sheets

(56) References Cited

U.S. PATENT DOCUMENTS

| | | | |
|---|---|---|---|
| 2006/0191250 A1* | 8/2006 | Neuerburg et al. | 56/6 |
| 2006/0195318 A1* | 8/2006 | Stanglmayr | 704/235 |
| 2007/0043567 A1* | 2/2007 | Gao et al. | 704/257 |
| 2007/0130563 A1 | 6/2007 | Elgazzar et al. | |
| 2007/0143103 A1* | 6/2007 | Asthana et al. | 704/200 |
| 2008/0027705 A1* | 1/2008 | Koga | 704/2 |
| 2008/0052061 A1 | 2/2008 | Kim et al. | |
| 2008/0052069 A1 | 2/2008 | Flanagan et al. | |
| 2008/0295040 A1* | 11/2008 | Crinon | 715/865 |
| 2009/0048832 A1 | 2/2009 | Terao | |
| 2009/0055175 A1* | 2/2009 | Terrell et al. | 704/235 |
| 2009/0240487 A1 | 9/2009 | Shen et al. | |
| 2009/0244372 A1 | 10/2009 | Petronelli et al. | |
| 2009/0271191 A1 | 10/2009 | Marquette et al. | |
| 2009/0292539 A1 | 11/2009 | Jaroker | |
| 2010/0036653 A1* | 2/2010 | Kim et al. | 704/3 |
| 2010/0070261 A1 | 3/2010 | Jin et al. | |
| 2010/0076746 A1 | 3/2010 | Aikawa et al. | |
| 2010/0088085 A1 | 4/2010 | Jeon et al. | |
| 2011/0093254 A1* | 4/2011 | Kuhn et al. | 704/2 |
| 2011/0313762 A1* | 12/2011 | Ben-David et al. | 704/231 |

OTHER PUBLICATIONS

Yuh et al., "Multilingual Machine Translation of Closed Captions for Digital Television with Dynamic Dictionary Adaptation", ISBN: 3 540 49667 X, 2006, pp. 422-429.

Popowich et al., "Machine Translation of Closed Captions", Machine Translation 15: 311-341, 2000.

* cited by examiner

VISUALIZING AUTOMATIC SPEECH RECOGNITION AND MACHINE TRANSLATION OUTPUT

BACKGROUND OF THE INVENTION

1. Field of the Invention

The present invention generally relates to automated speech processing. More particularly, the invention relates to method and systems that both convert speech to text, translate that text from one language to another language, and the display the translated text.

2. Background Art

Automated speech processing is used in many contexts including automatically generated closed-captions of broadcasts. Those broadcasts are now considered routine; they utilize both automatic speech recognition to create a transcription of a speaker's words, and automatic machine translation to translate the transcription from a source language into a target language. For example, in the TALES system, an Arabic, Chinese, or Spanish-language broadcast is automatically captioned with an English text, and the meaning of the spoken part of the broadcast is made apparent to viewers who do not speak these languages.

A number of procedures are currently available for speech recognition—that is, converting speech to text. The procedures have different levels of accuracy, security, speed, tolerance of poor audio quality and price. Court reporters or stenographers, for example, provide verbatim transcription but at a high price and with a time delay. Computer-based speech recognition is much less accurate but is less expensive and can be done substantially in real time. Transcription of stored messages, such as voice mail, is more difficult for computer-based speech recognition technology to perform accurately due to poor audio quality.

Machine translation, in general, makes use of computers to automate some or all of the process of translating text from one language to another. Originally, many machine translation systems used a word-based approach. Words were treated as the basic translation element; and, with some exceptions, each source language word was translated into a target language word to form the translation. Recently, significant advances have been made that use a phrase-based approach, which enables better handling of differences in linguistic typology, phrase recognition, and translation of idioms.

Many existing phrase-based translation systems still suffer from several disadvantages. For example, although they may robustly perform translations that are localized to a few consecutive words that have been recognized in training, most existing systems do not account for long-distance word dependency. For example, learning non-contiguous phrases, e.g., English-French pairs as simple as "not"→"ne . . . pas", can still be difficult in current phrasal systems.

Both the automatic speech recognition (speech-to-text, STT) and machine translation (MT) components make mistakes—and furthermore when STT and MT are used together, these mistakes may be compounded because the erroneous output of the speech recognition component is used as the input to the machine translation component, which itself introduces further errors. Additionally, machine translation may substantially reorder the concepts in a sentence, often in ways that conflict with scene changes in a video that accompanies the speaker. As a result, the viewer may be left quite confused about the speaker's intended meaning—superficially the erroneous parts of the transcript look very similar to the accurate parts. It is desirable if additional visual clues can be provided to help the viewer focus on the parts of the transcript that are likely to be the most accurate and meaningful. Such a system may also convey other characteristics (metadata) of the speech recognition and machine translation system that are informative to the viewer.

BRIEF SUMMARY

Embodiments of the invention provide an automated speech processing method, system and computer program product. In one embodiment, the method comprises using a speech-to-text (STT) engine for receiving an audio input and for converting the audio input to text data in a source language, and using a machine translation (MT) engine for receiving the text data from the STT engine and for translating the text data to text data in a target language. In this method, a caption engine is used for rendering the text data in the target language on a display device, and different visualization schemes are applied to different parts of the rendered text data based on defined characteristics of the STT engine and the MT engine.

In one embodiment, these defined characteristics include a defined confidence value representing the accuracy of the rendered text data. In an embodiment, the defined confidence value is based on both the accuracy of the converting of the audio input to text data in the source language, and the accuracy of the translating of the text data in the source language to the text data in the target language.

In an embodiment, the text data in the target language includes translated words and the caption engine renders these translated words, and the MT engine assigns a confidence score to each of at least some of the translated words. A selected one of the visualization schemes is applied to the rendered translated words that have a defined confidence score. For example, in one embodiment, the selected visualization scheme may be applied to the rendered translated words that have a confidence value above a given threshold value. As another example, the selected visualization scheme may be applied to the rendered translated words that have a confidence value below a preset threshold value.

In one embodiment, the text data in the source language includes words in the source language and the rendered text data includes rendered words; and for each of at least some of the words in the source language, the STT engine assigns a confidence value to said each word, and said each word corresponds to one or more of the rendered words. A selected one of the visualization schemes is applied to each of said rendered words that corresponds to one of the words in the source language that has a defined confidence value. For instance, in one embodiment, the selected visualization scheme may be applied to the one of the words in the source language that has a confidence value above a given threshold value. As another example, the selected visualization scheme may be applied to the one of the words in the source language that has a confidence value below a preset threshold value.

In an embodiment, identifiable portions of the rendered text correspond to identifiable portions of the audio input, and the STT engine measures a rate of speech in the audio input. A selected one the visualization schemes is applied to the identifiable portions of the rendered text that correspond to portions of the audio input having a rate of speech above a given value.

In one embodiment, the audio input includes spoken words, the rendered text includes rendered words that are rendered on the display device, and each of at least some of the rendered words corresponds to one of the spoken words. In this embodiment, a selected one of the visualization schemes is applied to the rendered words that are rendered on the display device more than a given time period after or before the corresponding one of the spoken words occurs in the audio input.

In an embodiment, the text data in the source language includes words that are converted from the audio input, and the text data in the target language includes words that are translated from the text data in the source language. A defined word aligning procedure is used to align some of the converted words from the audio input with corresponding translated words, and a selected one of the visualization schemes is applied to the rendering of the translated words that are not aligned with any of the converted words from the audio input.

The different visualization schemes used in embodiments of the invention may include highlighting (emphasis) or de-highlighting (de-emphasizing). Visualization includes closed-captioning, but closed-captioning is not the only method to visualize or transcribe a speaker's words.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention generally relates to automated speech processing; and more specifically, the invention relates to procedures that use a speech recognition component to convert speech to text, and a machine translation component to translate that text from one language to another language, and then display the translated text. The invention applies different visualization schemes to different parts of the displayed, translated text based on characteristics of the speech recognition component, the machine translation component, and the interaction between these two components.

Figure 1:
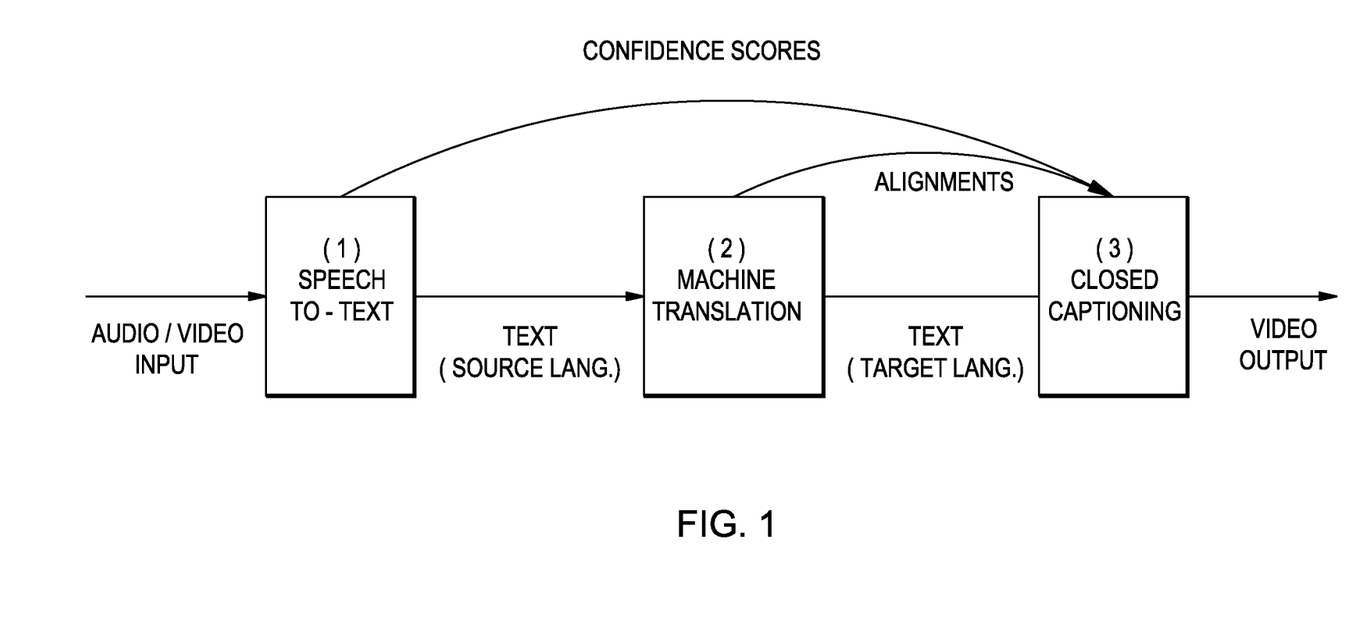
FIG. 1 illustrates a speech-to-text-to-translation method and system in accordance with an embodiment of the invention.

FIG. 1 generally illustrates a system and method in accordance with an embodiment of the invention. Generally, system 100 comprises speech-to-text (STT) engine 102, machine translation (MT) engine 104, and closed captioning engine 106. The STT engine takes as input either audio or the audio component of video, and produces text in the same language as the speech in the audio. It also produces various metadata, including timestamps that indicate when various words were spoken, and confidence measures. Typically a higher confidence measure indicates that the word produced by the STT engine is more likely to be the correct word.

The MT engine 104 takes the source language (e.g. Arabic, Chinese, Spanish, as produced by the STT engine) text as input, and outputs target language (e.g. English) text. It also produces metadata including a confidence measure associated with each word/phrase (similar to above) and an alignment. An alignment indicates which source language input words are most responsible for producing which target language output words. The translation output may be substantially reordered relative to the input. An alignment is not a strictly one-to-one alignment—source language words may produce multiple target language words or phrases (not necessarily contiguous, either), and multiple source language words or phrases may produce single target language words. Source language words may be left untranslated by the MT engine and hence left unaligned (unlinked) to any target words/phrases. Target language words (typically function words such as "a" or "the") may also be produced spontaneously by the MT engine in order to create a more fluent translation. These spontaneous words are also unaligned.

The intrinsic characteristics referred to above can include any metadata that the STT and MT engines can produce; they are not limited to the confidence score and alignments mentioned above. For example, another type of metadata is the Out-Of-Vocabulary (OOV) words in machine translation. An OOV word is a word that is unknown to the MT engine and therefore cannot be reliably translated. OOV words are usually "passed-through" in MT output.

The closed-captioning engine 106 takes as input target-language text as well as the metadata from the STT engine 102 and the MT engine 104 and incorporates the text into the video stream (typically in the form of a closed-caption.) It uses such metadata as the alignment and the timestamp to decide in which video frames text will begin to appear, and in which frames it will disappear. It also uses the metadata to decide how to render the text—for example, choice of color, font, size, underlining and italicization.

Embodiments of the invention provide highlighting based on intrinsic characteristics of the STT and the MT, and their interactions. Implementations may vary considerably in the choice of how to render the text (underlining vs. italicization vs. color, for example).

Examples of visualization based on intrinsic characteristics the STT or MT include:
(1) Highlight high-confidence MT words: the MT engine assigns a confidence score (e.g. a number between 0 and 1) to each word it produces. Higher numbers are more likely to be the correct word. If the confidence score is above a threshold (say 0.9), the closed-captioning system may color the corresponding word red.
(2) Highlight high-confidence STT words: the STT engine assigns a confidence score (e.g. a number between 0 and 1) to each word it produces. Higher numbers are more likely to be the correct word. If the confidence score is above a threshold (say 0.9), the closed-captioning system may color the corresponding (as determined by the MT alignment) target language words blue. Note that in this embodiment, the two examples discussed above use two different sources of metadata, and use different rendering styles accordingly for their highlighting.
(3) De-highlight low-confidence STT words—for example, use a paler color if the confidence measure is less than 0.1.
(4) De-highlight low-confidence MT words.
(5) Rate of speech—determined by the time-stamps in the STT metadata. Italicize unusually rapid speech and display this rapid speech longer (but fade gradually).

Examples of interactions between speech recognition and machine translation include:
(1) Word alignment between STT and MT—color target language words that are rendered more than 1.5 sec before or after the corresponding (via the alignment) source language were spoken (determined from the timestamp).
(2) Display but de-highlight words from MT output that cannot be aligned to any words in the STT output.

Figure 2:
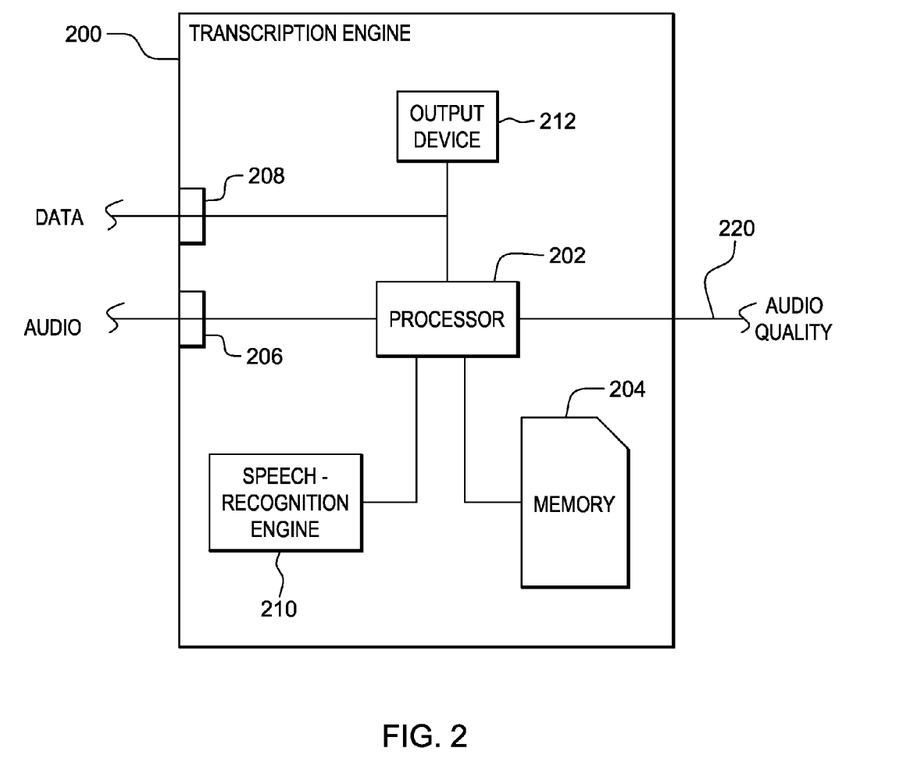
FIG. 2 shows, as an example, a speech-to-text component that may be used in the system of FIG. 1.

FIG. 2 illustrates, as one example, a transcription engine 200 that may be used in the system 100 of FIG. 1. Transcription engine 200 includes a processor 202, such as, for example, a microprocessor, a central processing unit, a desktop computer, a server, a laptop computer, a handheld computer or the like. Processor 202 controls the major functions of the transcription engine 200 including the functional operations described herein below. Processor 202 also processes the various inputs and/or data that may be required to operate transcription engine 200. A memory 204 is interconnected with processor 202. Memory 204 may be remotely located or co-located with processor 202. The memory 204 also may store data necessary or convenient for operation of the transcription engine 200. Transcription engine 200 further includes an audio reception interface 206 or port that can receive audio information from a user. Transcription engine 200 also includes a data interface 208 or port to receive or transmit data from and to the user.

Interconnected to processor 202 is a speech-to-text engine 210 that converts the audio signal received from the user into a text file that can be returned to the user or further processed as part of the evaluation. Engine 210 may be provided remotely from, integrated with, or co-located with processor 202. Transcription engine 200 further includes an output device 212, such as a display, a printer, an email generator, or the like, as is conventional in the art.

In operation, an audio signal is received from a user at port 206 of transcription engine 200. The audio signal may be streamed or batch loaded to the transcription engine. Processor 202 may fetch a user profile from memory 204 to facilitate transcription. The user profile is generally understood in the art to contain information regarding the user to train the recognition engine to the particular user. Such training may account for user specific speech. Speech-recognition engine 210 would process the audio using, for example, the user profile to convert the audio signal into text. Processor 202 would cause the transcription engine to output the text file via data port 208 to the user.

Figure 3:
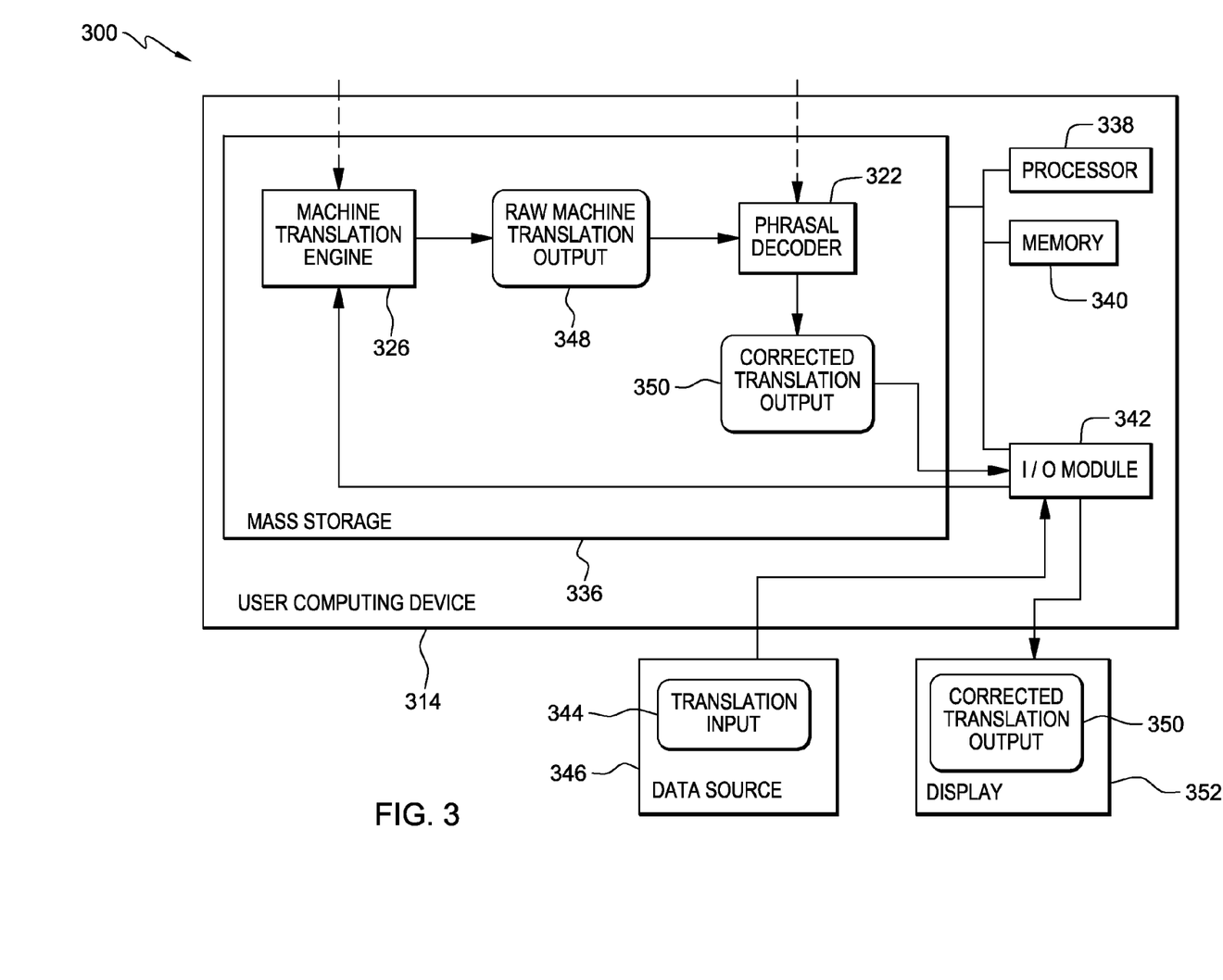
FIG. 3 depicts a machine translation component that may be used in the system of FIG. 1.

FIG. 3 depicts a machine translation component that may be used in system 100 of FIG. 1. Component 300 performs a statistical machine translation, and includes a user computing device 314, on which a phrasal decoder 322 may be executed at run time, to correct an output of a statistical machine translation engine 326. Computing device may further include a mass storage device 336, processor 338, and memory 340.

Phrasal decoder 322 is a type of phrase-based statistical machine translation engine, which uses a bilingual phrase table that contains bilingual phrase pairs and a statistical score representing the utility of each pair. Collectively, each phrase pair and statistical score may be referred to as a "mapping" between the members of the pair. Further, building the phrase table can be referred to as "training" the phrasal decoder. Statistical machine translation engine 326 is an engine configured to generate translations based on statistical models, the parameters of which are at least partly derived from the statistical analyses of one or more bilingual text corpora.

To prepare for run time, the statistical machine translation engine 326 and the trained phrasal decoder 322 are installed on the user computing device 314. Once installed, the statistical machine translation engine 326 is configured to receive translation input 344 via an I/O module 342 from a data source 346. Thereafter, the machine translation engine 326 is configured to produce a raw machine translation output 348, and the phrasal decoder 322 is configured to processes this raw machine translation output 348, to produce corrected translation output 350 based on the learned mappings discussed above. With this arrangement, the phrasal decoder may be said to be "chained" to the statistical machine translation 326. The corrected translation output can thus be displayed, via the I/O module 342, on a display 352 associated with the user computing device 314 of the system 300.

Used in this manner, it will be appreciated that the phrasal decoder 322 may be configured to produce corrected translation output 350 without displaying the raw machine translation output 348 to the user, and/or without prompting the user for a correction input to correct the raw translation output. Thus, initial correction of the raw machine translation output may be automated. Additionally, in some embodiments, the corrected translation output 350 may be presented to the user for further human editing and revision, if desired. Phrasal decoder 322 may be configured to determine the learned mappings by applying a word alignment algorithm. The word alignment algorithm may be based on a variety of models, such as a hidden markov model (HMM), an expectation-maximization (EM) model, a discriminative model, or a syntax-based model, for example. In one embodiment, an EM model may be used such as is used in the statistical machine translation engines known as IBM® Models 1-5.

In another embodiment, a word dependent transition model-based HMM (WDHMM) such as is used in the MSR-MT statistical machine translation engine may be utilized. It will be appreciated that a hidden Markov model is one type of dynamic Bayesian network, according to which a system may be modeled as a Markov process with hidden parameters. Thus, the WDHMM word alignment algorithm may be configured to attempt to extract the hidden parameters based on observable parameters, such as the differences between the machine translation output and the target human translation output.

System 300 may be configured to work with a variety of languages. Thus, it will be appreciated that the statistical machine translation engine 326 may be configured to translate between each of a plurality of language pairs, each language pair having a source language and a target language.

Figure 4:
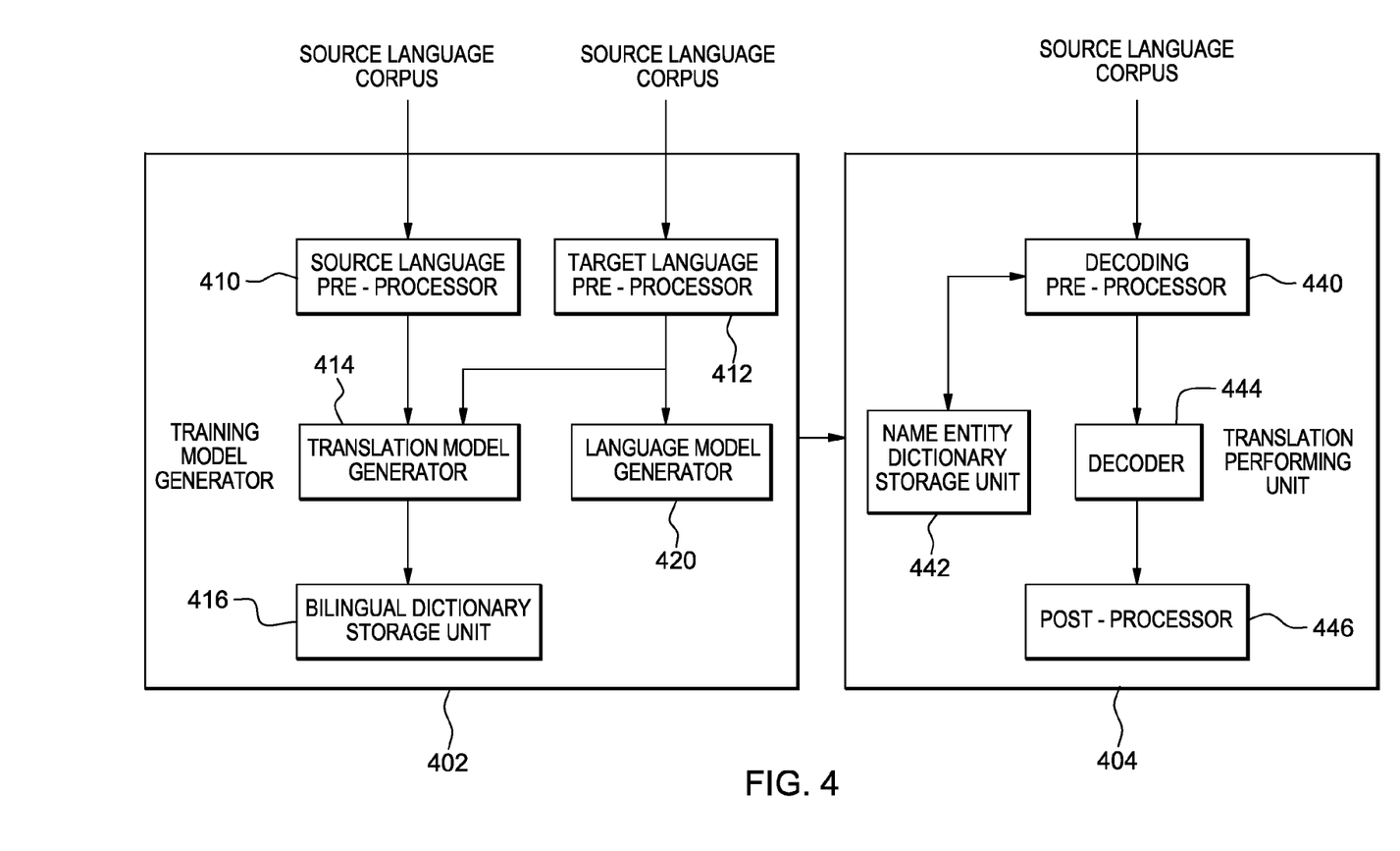
FIG. 4 illustrates an alternate machine translation component that may be used in the system of FIG. 1.

FIG. 4 shows an alternate machine translation apparatus that may be employed in system 100 of FIG. 1. The machine translation apparatus of FIG. 4 includes a training model generator 402, and a translation performing unit 404 that translates source language corpora for which a translation is requested. A source language pre-processor 410, a target language pre-processor 412, a translation model generator 414, a bilingual dictionary storage unit 416, and a language model generator 420 are included in the training model generator 402. The translation performing unit 404 includes a decoding pre-processor 440, a name entity dictionary storage unit 442, a decoder 444, and a post-processor 446. Like the source language pre-processor 410, the decoding pre-processor 440 analyzes morphemes of an input source language sentence to generate source language words to which tags representing characteristics per morpheme are attached. Like the source language pre-processor 410, the decoding pre-processor 440 may regularize the resulting source language sentence to which the tags are attached.

The decoder 444 translates each source language word to which a tag is attached into a target language sentence using a language model and a translation model. The decoder 444 may perform translation according to a statistical machine translation method. Basically, a probability model by which a source language sentence f is translated into a target language sentence e may be expressed as p(e|f). The decoder 444 applies Bayes' Theorem in order to determine the most probable translation results, and performs a process of forming the generation model derived from a translation model p(f|e) and a language model p(e).

In response to a name entity not being identified by bilingual language corpora, it is not included in the statistical model, and thus is indicated as unknown (UNK) by the decoder 444. According to this example, the decoder 444 analyzes a category of UNK through a context-based algorithm, searches for a target word for the name entity within the category, and performs translation. Also, in response to grammatical incompleteness of an input sentence disabling the category analysis, the decoder 444 may generate results as the target language is pronounced.

For this purpose, in response to a source language word being determined to have no corresponding target word in a source language sentence that is being processed, the decoder 444 may determine a category within which the source language word falls, search for a target word using a name entity dictionary stored in the name entity dictionary storage unit 442 that includes categorized information on name entities, and translate the source language word into the target word using the searched results. In addition, in order to determine a category of the source language word, the decoder 444 may perform context analysis on the source language sentence, including the source language that is determined to have no corresponding target word. The decoder 444 may use a target language corresponding to pronunciation of the source language word as the target word for the source language that is determined to have no corresponding target word in the bilingual dictionary.

While the name entity dictionary storage unit 442 and the decoder 444 are shown as separate blocks included in the translation performing unit 404, the name entity dictionary storage unit may be integrated into the decoder 444 or disposed outside the machine translation apparatus. The post-processor 446 may add, generate, or correct tense, punctuation, grammar, etc. of the translated results to generate a probable translation sentence in the target language.

Embodiments of the invention, as described above, provide visualization of target-language closed-caption text generated from source-language speech. Different visualization schemes are applied to different parts of the text based on intrinsic characteristics and metadata of the speech recognition system, machine translation system, and the interaction between them. These visual clues help the viewer focus on the parts of the transcript that are likely to be the most accurate and meaningful, and also convey other characteristics of the speech recognition and machine translation system that are informative to the viewer.

While it is apparent that the invention herein disclosed is well calculated to fulfill the objectives discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. An automated speech processing method comprising:
using a speech-to-text (STT) engine for receiving an audio input and for converting the audio input to text data in a source language;
using a machine translation (MT) engine for receiving the text data from the STT engine and for translating the text data to text data in a target language;
using a caption engine for rendering the text data in the target language on a display device, including receiving metadata from the STT engine and the MT engine identifying defined characteristics of specific portions of the rendered text data in the target language including a defined confidence value representing the accuracy of the rendered text data based on both the accuracy of the converting the audio input to text data in the source language and the accuracy of translating the text data including interactions between the STT engine and MT engine comprising alignment information, and determining specific portions of the text data in the target language to which said defined characteristics, identified by the metadata from the STT engine, apply; and
applying different visualization schemes based on color, font, size, underlining and italicization to different parts of the rendered text data based on the defined characteristics of the metadata.

2. The method according to claim 1, wherein
the applying different visualization schemes includes applying a selected one of the visualization schemes to a selected part of the rendered text data that has a MT confidence score above a given threshold value.

3. The method according to claim 1, wherein
the applying different visualization schemes includes applying a selected one of the visualization schemes to a selected part of the rendered text data that has a MT confidence score below a given threshold value.

4. The method according to claim 1, wherein:
the applying different visualization schemes includes applying a selected one of the visualization schemes to a selected part of the rendered text data that corresponds to one or more of the words in the source language that have a STT confidence value above a given threshold value.

5. The method according to claim 1, wherein
the applying different visualization schemes includes applying a selected one of the visualization schemes to a selected part of the rendered text data that corresponds to one or more of the words in the source language that have a STT confidence value below a given threshold value.

6. An automated speech processing system comprising:
one or more processing units configured to operate as:
a speech-to-text (STT) engine for receiving an audio input and for converting the audio input to text data in a source language;
a machine translation (MT) engine for receiving the text data from the STT engine and for translating the text data to text data in a target language; and
a caption engine for rendering the text data in the target language on a display device, and for applying different visualization schemes based on color, font, size, underlining and italicization to different parts of the rendered text data based on defined characteristics of metadata received from the STT engine and the MT engine identifying defined characteristics of specific portions of the rendered text data in the target language including a defined confidence value representing the accuracy of the rendered text data based on both the accuracy of the converting the audio input to text data in the source language and the accuracy of translating the text data including interactions between the STT engine and MT engine comprising alignment information, and determining specific portions of the text data in the target language to which said defined characteristics, identified by the metadata from the STT engine, apply.

7. An article of manufacture comprising:
at least one tangible computer readable medium device having computer readable program code logic tangibly embodied therein to execute machine instructions in one or more processing units for processing speech, said computer readable program code logic, when executing, performing the following:
receiving an audio input at a speech-to-text (STT) engine and converting the audio input to text data in a source language;
translating the text data, using a machine translation (MT) engine, to text data in a target language;
rendering the text data in the target language on a display device, including receiving metadata from the STT engine and the MT engine identifying defined characteristics of specific portions of the rendered text data in the target language including a defined confidence value representing the accuracy of the rendered text data based on both the accuracy of the converting the audio input to text data in the source language and the accuracy of translating the text data including interactions between the STT engine and MT engine comprising alignment information, and determining specific portions of the text data in the target language to which said defined characteristics, identified by the metadata from the STT engine, apply; and
applying different visualization schemes based on color, font, size, underlining and italicizing to different parts of the rendered text data based on the defined characteristics of the metadata.

8. The article of manufacture according to claim 7, wherein
the applying different visualization schemes includes applying a selected one of the visualization schemes to a selected part of the rendered text data that corresponds to one or more of the words in the source language that have a confidence value above a given threshold value.

* * * * *